United States Patent [19]

Sfikas

[11] Patent Number: 4,549,658
[45] Date of Patent: Oct. 29, 1985

[54] MINI DISK HOLDER

[76] Inventor: Nicholas Sfikas, 29 Widewaters La., Pittsford, N.Y. 14534

[21] Appl. No.: 579,875

[22] Filed: Feb. 13, 1984

[51] Int. Cl.⁴ ...................... B65D 27/32; B65D 85/30
[52] U.S. Cl. .................................... 206/614; 206/312; 206/444; 206/461; 206/469; 206/806; 206/807; 229/74; 383/5; 383/41
[58] Field of Search ............... 206/309, 311, 312, 313, 206/444, 806, 807, 610, 612, 614, 605, 461, 469, 484, 608, 609, 634; 229/68 R, 74; 383/41, 66, 5, 906

[56] References Cited

U.S. PATENT DOCUMENTS

| | | | |
|---|---|---|---|
| 2,345,230 | 3/1944 | Bender | 229/68 R |
| 3,217,770 | 11/1965 | Garth | 383/906 X |
| 3,339,826 | 9/1967 | Beskind | 229/68 R |
| 3,402,810 | 9/1968 | Percelay | 206/461 |
| 3,507,444 | 4/1970 | Werby | 229/68 R |
| 3,522,907 | 8/1970 | Utterback, Jr. | 229/68 R |
| 3,525,470 | 8/1970 | Carrigan | 229/68 R |
| 4,247,002 | 1/1981 | Horian | 206/313 |

FOREIGN PATENT DOCUMENTS 1403356  8/1975  United Kingdom ............... 206/312

Primary Examiner—Allan N. Shoap
Assistant Examiner—Bryon Gehman
Attorney, Agent, or Firm—Shlesinger, Arkwright, Garvey & Fado

[57] ABSTRACT

A mini disk holder has a first and second thermoplastic sheet sealed at the periphery thereof for providing a pocket between the sheets. A slit is provided in one of the sheets to permit a mini disk to be inserted into the holder. The slit sheet is adhesively secured to a panel in order to seal the slit and prevent further access to the disk. The other of the sheets includes a thinned groove line providing a weakened area which may be removed therefrom in order to provide an opening to permit access to the article.

20 Claims, 4 Drawing Figures

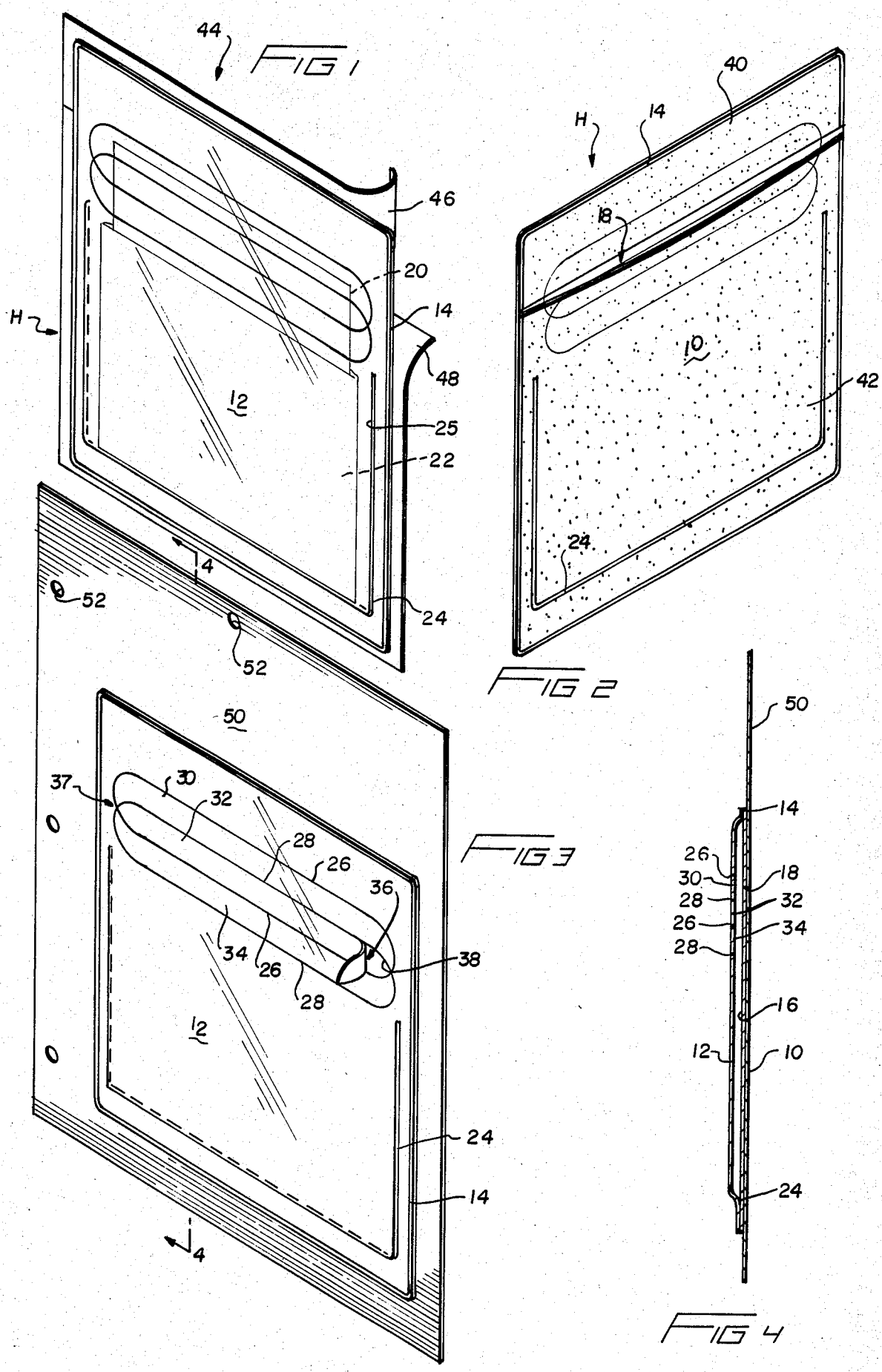

MINI DISK HOLDER

BACKGROUND OF THE INVENTION

Computer programmers frequently store their software on flexible magnetic media or mini disks. The mini disks come in several popular sizes and all are capable of storing tremendous amounts of information or software. The mini disk may be conveniently inserted into an electronic computer which is capable of utilizing the software or the information. Consequently, the mini disks provide a very convenient means for programming a computer, transferring a program among computers and storage of information.

The proliferation of small computers has generated a tremendous need for computer programming, a need filled by supplying programs on mini disks. The mini disks are frequently mailed to the user or the user may purchase the mini disks in a retail establishment.

A major concern of the purchaser or recipient of the mini disks is that the disks not be tampered with or damaged prior to receipt. The damage may be of the physical type where dust or other hard particulates scratch the relatively soft magnetic media of the disks thereby rendering the software inoperable. Another cause of damage is due to the accumulation of a static charge which can erase or otherwise alter the magnetic coating of the disks. Consequently, one skilled in the art will appreciate that there is a need for a mini disk holder which prevents tampering with the disk while also preventing scratching and static charge accumulation.

Craig, et al, U.S. Pat. No. 3,940,778 discloses a photograph and negative holder comprising two sheets of transparent material which are joined to define a pocket for receipt of a photograph. A flap having an adhesive thereon closes the pocket and provides a convenient means for mounting the holder to a panel. An opening communicating with the pocket will permit entry of dust, however.

Rohde, U.S. Pat. No. 3,186,628 discloses a thermoplastic flexible packet which has an opening therein defined by a thin groove line in the envelope body portion. The groove line defines a pre-determined opening permitting access to the interior of the packet wherein an article is stored. The package must be heat sealed, however, and this may damage the mini disk.

Kugler, U.S. Pat. No. 3,387,766 discloses a flexible package which is sealed around its periphery and has an opening at one end thereof to permit the removal of the article contained in the package. The package must be heat sealed and thereby may damage the mini disk.

From the above, one skilled in the art will appreciate that a mini disk holder is advantageous in order to permit the continued utilization of mini disks by computer programmers. Many computer programmers do not have the equipment necessary to seal plastic envelopes because that equipment can be expensive. Additionally, the sealing equipment frequently emits electronic noise which may damage the disk or otherwise alter the magnetic coating contained thereon. Consequently, a mini disk holder which overcomes the disadvantages of the prior art and which also does not require the utilization of special sealing equipment is advantageous if continued utilization of mini disks is to occur.

OBJECTS AND SUMMARY OF THE INVENTION

The disclosed mini disk holder provides a new and unique means for permitting the shipment of a mini disk while preventing tampering with the disk as well as damage caused by scratching or static charge accumulation. Two sheets of thermoplastic sheet material are joined at the periphery thereof for providing a pocket between the sheets. A widthwise slit is disposed in one of the sheets at one end thereof providing means for placing a mini disk in the pocket. Adhesive means are disposed on the outer surface of the slit sheet to permit securing of the outer surface to a panel for thereby sealing the slit and preventing further access to the pocket through the slit. A thin groove line is provided on the other sheet and defines a sealed closure which may be readily opened by the ultimate recipient of the mini disk holder. Any tampering with the disk will be readily apparent to the recipient because of this sealing system. Additionally, the flexible sheet material is of a vinyl plastic which prevents the accumulation of static charge.

A primary object of the disclosed invention is to provide a mini disk holder which is easy to manufacture and which overcomes the disadvantages of the prior art.

An additional object of the disclosed invention is to provide a mini disk holder which makes readily apparent any tampering with the disk.

Yet a further object of the disclosed invention is to provide a mini disk holder which is sealed to prevent damage to the disk by scratching or the accumulation of static charge.

Yet a further object of the disclosed invention is to provide a mini disk holder which is mounted to a panel which may be hung from a retail establishment job rack or which may be placed in a ring binder.

Still yet another object of the disclosed invention is to provide a mini disk holder having tamper indicating tear means which define an opening having an area selected from three pre-determined sizes.

Still yet another object of the disclosed invention is to provide a mini disk holder which has a release strip over an adhesive layer in order to permit the disk holder to be transmitted to the programmer in a condition which is readily usable.

Yet still a further object of the disclosed invention is to provide a mini disk holder which has at least one transparent surface in order to permit the recipient to view any printed indicia on the mini disk envelope.

A further object of the disclosed invention is to provide a mini disk holder which may be sealed without damaging the mini disk by heat or radio frequency noise.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a perspective view of the mini disk holder of the invention with the mini disk in its envelope shown in phantom lines;

FIG. 2 is a rear perspective view of the mini disk holder of FIG. 1 with the release strip removed and with the slit opened;

FIG. 3 is a perspective view of the mini disk holder of FIGS. 1 and 2 mounted to a panel and with a portion of the tamper indicating tear means opened; and, FIG. 4 is a cross-sectional view taken along the section 4—4 of FIG. 3 and viewed in the direction of the arrows.

DESCRIPTION OF THE INVENTION

A mini disk holder H, as best shown in FIGS. 1-4, include a first vinyl thermoplastic flexible sheet 10 which is secured to a second vinyl transparent flexible sheet 12. It is obvious that opaque materials including either plastics, resins, paper or the like might be used for holder H.

The vinyl sheets 10 and 12 are preferably comprised of a transparent vinyl plastic sheet material which prevents the accumulation of static charge and is of a type well known to those skilled in the art. The sheets 10 and 12 are sealed together at the periphery thereof by a heat sealed groove line 14 which is continuous for thereby providing a pocket 16, as best shown in FIG. 4, between the sheets 10 and 12.

Sheet 10 includes a widthwise extending slit 18 which is adapted to permit a mini disk 20 and its envelope 22 to be inserted into the pocket 16. A heat sealed groove line 24 secures sheets 10 and 12 inwardly of groove line 14 and thereby defines a substantially rectangular open ended receptacle in pocket 16 for receipt of the mini disk 20 and the mini disk envelope 22, as best shown in FIG. 1. The groove lines 14 and 24 seal the sheets 10 and 12 prior to the insertion of disk 20.

Front sheet 12 includes two thinned groove lines 26 and 28 which together define substantially widthwise intersecting ovals having parallel major axes and providing closure portions 30, 32 and 34. The groove lines 26 and 28 each serve to weaken or thin the front sheet 12 and, therefore, the closure portions 30-34 may be readily removed from front sheet 12 to provide access to pocket 16 and mini disk 20. As best shown in FIG. 3, piercing sheet 12 at end 36 and lifting upwardly on end 36 of closure portion 32 will permit removal of portion 32 by tearing along the cooperating groove lines 26 and 28 until end 37 is reached. Consequently, a widthwise external opening 38 is created to permit access to pocket 16. Additionally, all three portions 30-34 may be similarly removed to define a larger opening or any two of the portions 30-32 or 32-34 may be removed. In this way, the recipient may select the size opening which is desired.

One skilled in the art will appreciate that should the recipient notice that any of the portions 30-34 have been opened or removed prior to receipt, then the tampering will be readily apparent. The portions 30-34 are only to be removed by the recipient and, consequently, should the widthwise extending opening 38 which is sealed by the portion 32 be viewed then the tampering will be evident.

Preferably the outer surface 40 of first sheet 10 is coated over substantially the entire surface thereof with an adhesive means 42. A strippable release sheet 44 is preferably silicone coated paper and has a portion 46 disposed on adhesive means 42 of rear sheet 10 above slit 18 and a second portion 48 disposed below slit 18. The release sheet 44 thereby permits the holder H to be manufactured in one location and then sent to the computer programmer who may then place a mini disk 20 therein and then adhesively seal the holder H.

The slit 18 is sealed after the mini disk 20 and its envelope 22 have been inserted into the receptacle 25 of pocket 16. Removal of the release strips 46 and 48 covering the adhesive means 42 permits the outer surface 40 of rear sheet 10 to be applied to a panel 50. The adhesive 42 engages the panel 50, which is preferably cardboard, making removal of the holder H particularly difficult. Other types of panels will be readily apparent to those skilled in the art, and the slit 18 is sealed thereby, as best shown in FIG. 4, and entry to the compartment 16 through slit 18 is prevented.

Should someone attempt to separate the outer surface 40 from the panel 50, then the adhesive 42 will tear away a portion of the panel 50 and thereby make readily apparent the tampering. Additionally, the separated portion will not be sealed to the panel 50 afterwards. Consequently, the mini disk holder H when adhesively mounted to a panel 50 provides an efficient holder for mini disk 20 while simultaneously preventing damage to the mini disk 20 by the scratching of particulates or the excess accumulation of static charge. Furthermore, should anyone attempt to tamper with the mini disk 20, then that attempt will be readily apparent to the recipient.

The panel 50 includes a number of apertures 52 which permit the panel 50 and the holder H to be placed in a ring binder or suspended from a job rack.

Although the slit 18 and the closure portions 30-34 are shown to be aligned at one end of the holder H, one skilled in the art will appreciate that the slit 18 may be disposed at one end, such as the lower end of sheet 10 while the closure portions 30-34 sealing the opening 38 may be disposed at the opposite end. Similarly, the slit 18 and the closure portions 30-34 may extend lengthwise of the holder H or any combination thereof.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features herein before set forth, and fall within the scope of the invention of the limits of the appended claims.

What I claim is:

1. A mini disk holder, comprising:
   (a) a first sheet having inner and outer surfaces;
   (b) a second sheet substantially overlying said first sheet;
   (c) said first and second sheets having substantial length and width;
   (d) means securing said first and second sheets at generally the periphery thereof providing a pocket between said sheets;
   (e) a slit disposed in said first sheet providing means for inserting an article into said pocket;
   (f) adhesive means disposed over said outer surface of said first sheet permitting said outer surface to be secured to a panel; and
   (g) two groove line means disposed in the outer surface of said second sheet forming two intersecting ovals having generally parallel major axes so that said ovals provide first, second and third tamper indicating tear means;

(h) each of said tamper indicating tear means removable from said second sheet for thereby providing an opening in said second sheet permitting access to said pocket and whereby unauthorized removal of any one of said tear means is thereby readily apparent.

2. The holder as defined in claim 1, further comprising:
(a) adhesive means associated with an outer surface of said first sheet for securing said outer surface to a panel.

3. The holder as defined in claim 2, wherein:
(a) said adhesive means is disposed over substantially the entire surface of said outer surface.

4. The holder as defined in claim 3, wherein:
(a) a strippable release sheet is disposed on said adhesive means for releaseably covering said adhesive means.

5. The holder as defined in claim 2, further comprising:
(a) a panel; and,
(b) said adhesive means secures said outer surface to said panel whereby said slit is sealed and access to said pocket is prevented thereby.

6. The holder as defined in claim 5, wherein:
(a) said panel includes means for engaging a support.

7. The holder as defined in claim 6, wherein:
(a) said means for engaging a support includes at least a first aperture.

8. The holder as defined in claim 1, wherein:
(a) said slit extends substantially along said first sheet width at generally one end thereof.

9. The holder as defined in claim 8, wherein:
(a) said tear means being generally aligned with said slit.

10. The holder as defined in claim 1, wherein:
(a) said tear means being adapted for providing an opening having an area selected from at least two pre-determined sizes.

11. The holder as defined in claim 10, wherein:
(a) said opening extends along substantially said second sheet width at generally one end thereof.

12. The holder as defined in claim 1, wherein:
(a) said first and second sheets comprised of a thermoplastic flexible sheet material.

13. The holder as defined in claim 12, wherein:
(a) at least one of said first and second sheets being transparent.

14. The holder as defined in claim 12, wherein:
(a) said means securing said first and second sheets includes a heat sealed groove line.

15. The holder as defined in claim 14, wherein:
(a) another heat sealed groove line disposed inwardly of said heat sealed groove line; and,
(b) said another heat sealed groove line forming a generally rectangular open ended receptacle adapted for receipt therein of an article.

16. A mini disk holder, comprising:
(a) a first thermoplastic sheet having inner and outer surfaces;
(b) a second thermoplastic sheet substantially overlying said first sheet;
(c) said first and second sheets having substantial length and width;
(d) heat sealed means securing said first and second sheets at generally the periphery thereof providing a pocket between said sheets;
(e) a slit disposed in said first sheet providing means for inserting an article into said pocket;
(f) adhesive means disposed over said outer surface of said first sheet permitting said outer surface to be secured to a panel; and,
(g) two groove line means disposed in the outer surface of said second sheet forming two intersection ovals having generally parallel major axes so that said ovals provide first, second and third tamper indicating tear means;
(h) each of said tamper indicating tear means removable from said second sheet for thereby providing an opening in said second sheet permitting access to said pocket and whereby unauthorized removal of any one of said tear means is thereby readily apparent.

17. The holder as defined in claim 16, further comprising:
(a) a panel; and,
(b) said adhesive means secures said outer surface to said panel whereby said slit is sealed and access to said pocket therethrough is prevented.

18. The holder as defined in claim 16, wherein:
(a) said slit extends substantially along the width of said first sheet at generally one end thereof; and,
(b) said tear means being aligned with said slit.

19. The holder as defined in claim 16, wherein:
(a) at least one of said first and second sheets being transparent.

20. The holder as defined in claim 16, wherein:
(a) a heat sealed groove line disposed inwardly of said heat seal means; and,
(b) said heat seal groove line forming an open-ended receptacle adapted for receiving therein an article.

* * * * *